US012754671B2

(12) United States Patent
Kaminaga

(10) Patent No.: US 12,754,671 B2
(45) Date of Patent: Oct. 6, 2026

(54) SEMICONDUCTOR DEVICE, STORAGE SYSTEM AND OPERATION METHOD

(71) Applicant: Winbond Electronics Corp., Taichung City (TW)

(72) Inventor: Takehiro Kaminaga, Tokyo (JP)

(73) Assignee: Winbond Electronics Corp., Taichung City (TW)

( * ) Notice: Subject to any disclaimer, the term of this patent is extended or adjusted under 35 U.S.C. 154(b) by 0 days.

(21) Appl. No.: 19/227,499

(22) Filed: Jun. 4, 2025

(65) Prior Publication Data

US 2026/0010289 A1 Jan. 8, 2026

(30) Foreign Application Priority Data

Jul. 2, 2024 (JP) ................................ 2024-106627

(51) Int. Cl.
*G06F 3/06* (2006.01)

(52) U.S. Cl.
CPC ............ *G06F 3/061* (2013.01); *G06F 3/0655* (2013.01); *G06F 3/0679* (2013.01)

(58) Field of Classification Search
None
See application file for complete search history.

(56) References Cited

U.S. PATENT DOCUMENTS

| | | | |
|---|---|---|---|
| 8,996,785 | B2 | 3/2015 | Lee et al. |
| 10,289,482 | B2 | 5/2019 | Kodera et al. |
| 10,453,524 | B2 | 10/2019 | Kaminaga et al. |
| 2011/0072201 | A1 | 3/2011 | Lee et al. |
| 2017/0060477 | A1 | 3/2017 | Kodera et al. |
| 2018/0090202 | A1 | 3/2018 | Kaminaga et al. |
| 2023/0384935 | A1 | 11/2023 | Gillingham et al. |

FOREIGN PATENT DOCUMENTS

| | | | |
|---|---|---|---|
| CN | 105304130 | A * | 2/2016 |
| JP | 6232109 | | 11/2017 |
| TW | 201142604 | | 12/2011 |
| TW | 201709214 | | 3/2017 |

OTHER PUBLICATIONS

"Office Action of Taiwan Counterpart Application", issued on Jan. 30, 2026, p. 1-p. 7.

* cited by examiner

*Primary Examiner* — Brian R Peugh
(74) *Attorney, Agent, or Firm* — JCIPRNET

(57) ABSTRACT

Provided is a semiconductor device that combines a NOR flash memory and a NAND flash memory. A stacked flash memory includes a NOR flash memory, a NAND flash memory, a controller, and an external bus that can input/output data in synchronization with a serial clock signal. When receiving a read command according to specifications of the NOR flash memory from the external bus, the controller responds the read command to cause a portion of specific data read from the NOR flash memory to be serially output, and then cause a remaining portion of the specific data read from the NAND flash memory to be serially output. In this way, data is read from the expanded NAND flash memory in the same manner as accessing the NOR flash memory.

15 Claims, 4 Drawing Sheets

SEMICONDUCTOR DEVICE, STORAGE SYSTEM AND OPERATION METHOD

CROSS-REFERENCE TO RELATED APPLICATION

This application claims the priority benefits of Japanese application serial no. 2024-106627, filed on Jul. 2, 2024. The entirety of the above-mentioned patent application is hereby incorporated by reference herein and made a part of this specification.

BACKGROUND

Technical Field

The disclosure relates to a semiconductor device including a NOR flash memory and a NAND flash memory.

Related Art

NOR flash memory is capable of random access and high-speed read, while NAND flash memory may achieve high integration density storage cell array and may perform high-speed programming of large capacity data, but compared with NOR flash memory, the time required for read becomes longer.

In recent years, memory equipped with serial interface that achieves high-speed input/output data with fewer terminal numbers is increasing. For serial interface, for example, there is the standard Serial Peripheral Interface (SPI) which requires 8-bit instruction code and 16-bit address.

NOR flash memory is equipped with so-called burst mode or page mode functionality that can continuously perform data registration/output. For example, in read operation, as shown in FIG. 1(A), when a chip select signal CS becomes low active, and read command and address are input from an external terminal in synchronization with a serial clock signal, the column address automatically increments, and the read data is output from the external terminal in sequence in synchronization with the serial clock signal. In programming operation, when programming command and address are input from the external terminal, the column address automatically increments, and programming data input from the external terminal in synchronization with the serial clock signal is programmed into the storage cell. This continuous read or continuous write ends when the chip select signal CS becomes high level (Patent Literature 1).

In order to achieve compatibility with NOR flash memory, memory equipped with serial interface in NAND flash memory has been put into practical use. In the case of continuous read in NAND flash memory, when continuous read command and address are input from the external terminal, the data read from the page of the storage cell array is held in the page buffer/readout circuit, the column address automatically increments, and the data held in the page buffer/readout circuit is output from the external terminal in synchronization with the serial clock signal.

FIG. 1(B) is a timing diagram of continuous read operation of NAND flash memory. The chip select signal CS becomes low active, 8-bit page data read command (for example, "13h") and 16-bit page address PA (row address for selecting block and page) are input, which is equivalent to after the latency of time for data transmission of the selected page corresponding to the storage cell array to the page buffer/readout circuit, 8-bit read command and 16-bit address (empty dummy address) for continuous read are input. NAND flash memory becomes continuous read mode through the input of these series of commands and addresses, the input page address PA automatically increments, and the read page data is sequentially in synchronization with the serial clock to be serially output to the external. During the period when the chip select signal CS is low active, that is, during the continuous read mode period, the flash memory does not require input of page data read command and page address PA (Patent Literature 1).

[Patent Literature 1] Japanese Patent No. 6232109

SUMMARY

As the code, operating system, and data used in the system increase, the capacity of flash memory also tends to increase. NOR flash memory can perform high-speed read through random access, has excellent durability or retention characteristics, and is thus suitable for storing boot code or firmware for system startup. However, in NOR flash memory, a certain capacity or above cannot be productized due to die size limitations, and even if productized, larger capacity becomes more expensive.

In view of this existing issue, the disclosure aims to provide a semiconductor device that combines a NOR flash memory and a NAND flash memory.

The semiconductor device of the disclosure includes the NOR flash memory and the NAND flash memory, and the semiconductor device includes the following. An input/output component is capable of inputting/outputting data via an input/output bus in synchronization with a serial clock signal. Also, a controller component controls operations of the NOR flash memory and the NAND flash memory, the controller component, in response to a read instruction received from the input/output component, causes a portion of specific data read from the NOR flash memory to be serially output from the input/output component, and then causes a remaining portion of the specific data read from the NAND flash memory to be serially output from the input/output component.

The semiconductor device further includes a register, the register stores information related to operation specifications of the input/output component, and the register is accessible from external. The controller component outputs the portion of the specific data during an initial latency period of continuous reading of the NAND flash memory. The controller component, in response to a write instruction received from the input/output component, writes the portion of the specific data to the NOR flash memory and writes a remaining portion of the specific data to the NAND flash memory. The portion of the specific data corresponds to a size corresponding to a bus width of the input/output component and a frequency of the serial clock signal. The portion of the specific data is less than or equal to a data size that can be serially output during an initial latency period of continuous reading of the NAND flash memory.

The storage system of the disclosure includes the following. A semiconductor device is provided. Also, a host device is connected to the semiconductor device via an input/output bus, in the storage system, the host device acquires the information related to the operation specifications stored in the register, and based on the information related to the operation specifications, allocation of specific data for programming the NOR flash memory and the NAND flash memory is determined.

The disclosure includes an operation method of a semiconductor device including a NOR flash memory and a NAND flash memory, a controller component controls operations of the NOR flash memory and the NAND flash memory, in response to a read instruction received from the input/output component, causes a portion of specific data read from the NOR flash memory to be serially output, and then causes a remaining portion of the specific data read from the NAND flash memory to be serially output.

According to the disclosure, after a portion of specific data read from the NOR flash memory is serially output from the input/output component, a remaining portion of specific data read from the NAND flash memory is serially output from the input/output component, thus enabling the storage of large-sized specific data while achieving high-speed reading of the specific data. Additionally, by storing specific data corresponding to the latency period of the NAND flash memory in the NOR flash memory, and reading the specific data from the NOR flash memory during the initial latency period, the disadvantage of NAND flash memory latency is eliminated.

DESCRIPTION OF THE EMBODIMENTS

The semiconductor device of the disclosure includes at least one NOR flash memory and at least one NAND flash memory, achieving large memory size capacity while realizing high-speed access method equivalent to NOR flash memory. For example, chips of NOR flash memory and chips of NAND flash memory are structured within a package. For example, NAND flash memory chips and NOR flash memory chips are stacked and mounted on a circuit board, or individual chips are arranged and mounted on a circuit board.

Figure 2:
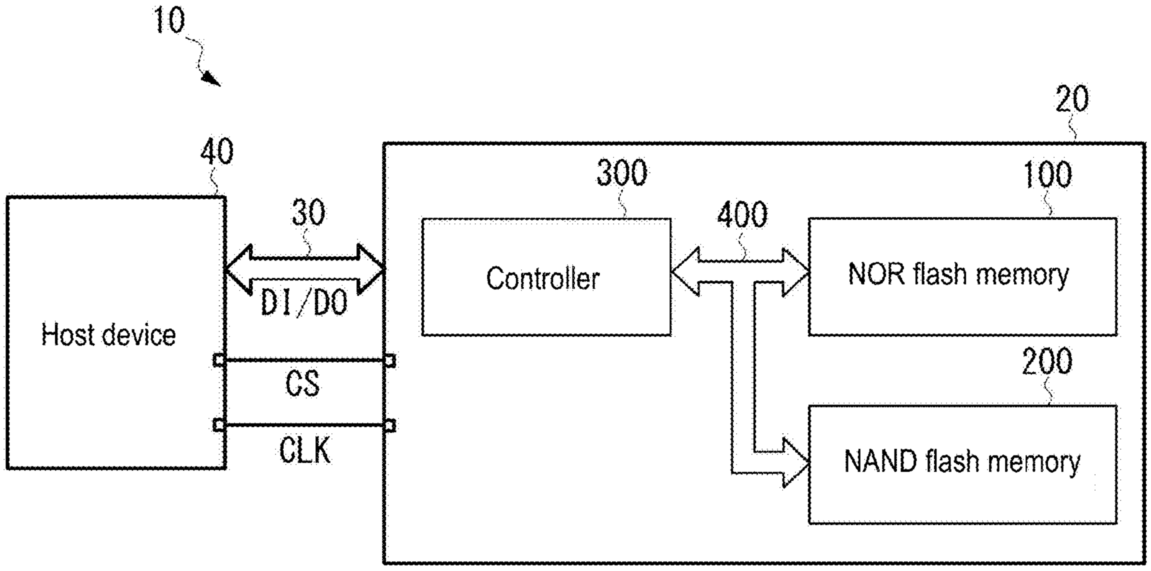
FIG. 2 is a structural block diagram of a storage system according to an embodiment of the disclosure.

FIG. 2 is a structural diagram of a storage system according to an embodiment of the disclosure. A storage system 10 includes a stacked flash memory 20 and a host device 40. The stacked flash memory 20 includes a NOR flash memory 100, a NAND flash memory 200, a controller 300, and an internal bus 400. The NOR flash memory 100, the NAND flash memory 200, and the controller 300 are interconnected via the internal bus 400, and data is transmitted therebetween via the internal bus 400.

The stacked flash memory 20 is connected to the host device 40 via, for example, an external bus 30, a chip select signal line CS, and a serial clock signal line CLK. The external bus 30, for example, serially transmits data between the host device 40 and the stacked flash memory through SPI communication method. There is no particular limitation on the input/output (IO) bus width of SPI or the frequency of the serial clock signal. For example, the IO bus width may be 1-bit single-line SPI, 2-bit dual-line SPI, 4-bit quad-line (Quad) SPI, or 8-bit octal-line (Octal) SPI. The frequency of the serial clock signal may be, for example, 104 MHZ, 133 MHz, 166 MHZ, or other frequencies. In the situation where the external bus 30 corresponds to SPI, the internal bus 400 may have an SPI with the same operation specifications as the external bus 30, or it may be an SPI with faster transmission speed than the external bus 30. That is, the internal bus 400 has at least the same or higher transmission speed than the external bus 30. For example, when the external bus 30 is a quad-line SPI, the internal bus 400 may be a quad-line SPI or an octal-line SPI. Additionally, the external bus 30 may also correspond to Open NAND Flash Interface (ONFI).

The stacked flash memory 20 is not particularly limited, and may include a chip (die) formed with the NOR flash memory 100, a chip formed with the NAND flash memory 200, and a chip formed with the controller 300, or it may also include: a chip formed with the NOR flash memory 100 and the controller 300, and a chip formed with the NAND flash memory 200. The stacked chips are electrically connected to each other. For example, conductive pads formed on the surface of one chip are directly or indirectly connected via conductive components to conductive pads formed on the surface of another chip. Alternatively, electrical connections between chips may be realized through conductive components that penetrate through the stacked chips. The chips are not limited to being stacked, but may also be arranged on a circuit board.

The stacked flash memory 20 includes a package (for example, resin sealing or ceramic sealing) of architecturally stacked chips. The package includes external terminals for providing an electrical interface between the internal chips and the external host device 40, for example, a ball grid array (BGA) or land grid array (LGA) formed on the back of the package.

The host device 40 is not particularly limited, for example, and may be formed by a computer device including, for example, a microprocessor, a central processing unit (CPU), a read-only memory (ROM)/random access memory (RAM). The host device 40 outputs instructions, addresses, and data to the stacked flash memory 20 via the external bus 30, and outputs serial clock signals or chip select signals via the CLK signal line or CS signal line, causing the stacked flash memory 20 to execute the desired operations.

The instructions used by the host device 40 are instructions based on the NOR flash memory 100 specifications, that is, the host device 40 uses the stacked flash memory 20 as if it were a NOR flash memory, issuing programming instructions, read instructions, and erase instructions for NOR flash memory, with the NAND flash memory 200 being used as an extended storage area in a manner invisible to the user.

Figure 1A:
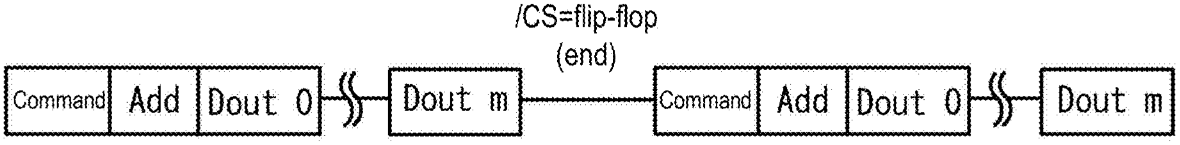
FIG. 1(A) illustrates a timing diagram of continuous read operation of a NOR flash memory.
Figure 1B:
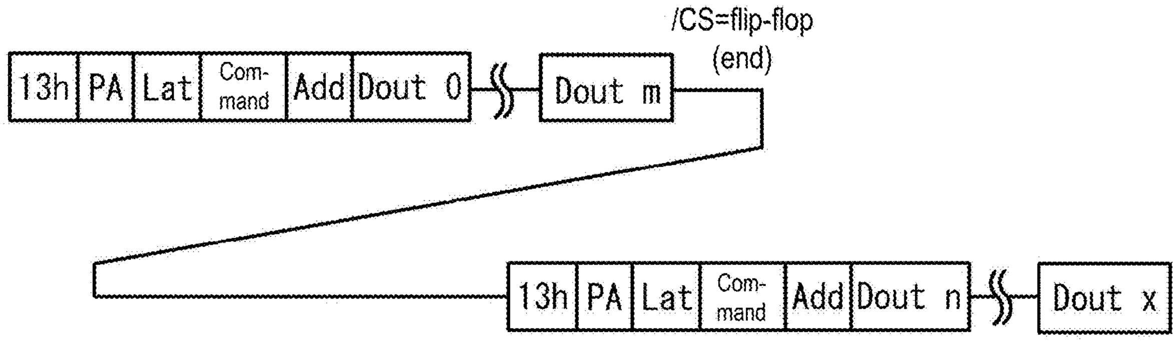
FIG. 1(B) illustrates a timing diagram of continuous read operation of a NAND flash memory.

Additionally, the host device 40 uses separate instructions for operating the NOR flash memory 100 and for operating the NAND flash memory 200, allowing the NOR flash memory 100 and NAND flash memory 200 to operate individually. For example, as shown in FIG. 1(A) and FIG. 1(B), the host device 40 may enable either the NOR flash memory 100 or the NAND flash memory 200 via the CS signal, for example, programming large capacity data into the NAND flash memory 200, and programming small capacity data that requires high-speed reading into the NOR flash memory 100.

Figure 3:
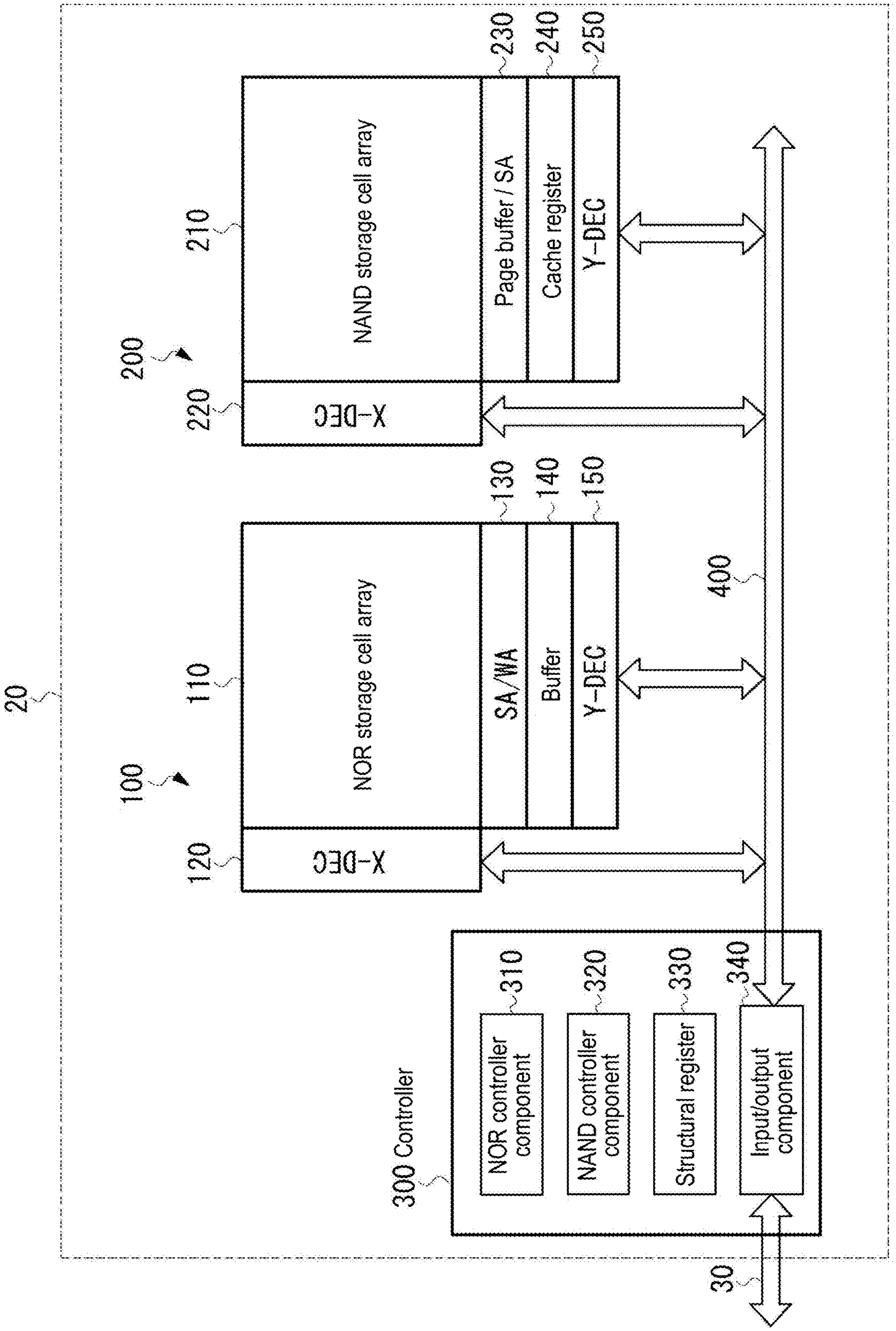
FIG. 3 is a diagram showing an internal structure of a stacked flash memory according to an embodiment of the disclosure.

FIG. 3 is a diagram showing an example of the internal structure of the stacked flash memory 20 according to this embodiment. The NOR flash memory 100 includes components as follows. A NOR storage cell array 110 is provided, multiple storage cells are connected in parallel between bit lines and source lines. A row address decoder (X-Decoder, X-DEC) 120 selects/drives word lines based on row addresses. A SA/WA (Sense Amplifier/Write Amplifier) 130 reads data read from storage cells or writes data into storage cells. A buffer 140 holds one page of data during read operations or programming operations. A column address decoder (Y-Decoder, Y-DEC) 150 selects bit lines based on column addresses.

The NOR flash memory 100 is equipped with the function to continuously perform data input/output (continuous reading or continuous writing), where data reading or programming is performed in bit units or page units. The page unit may be set arbitrarily. The buffer 140 of the NOR flash memory 100 may store one page of data, and during programming operations, the buffer 140 holds data received from the input/output component 340. The data held in the buffer 140 is selected according to the column address of the Y-DEC 150, the selected data is transmitted to the SA/WA (Sense Amplifier/Write Amplifier) 130, and the SA/WA 130 programs the selected storage cells of the selected bits based on the transmitted data. Additionally, during read operations, the buffer 140 holds one page of data read from the NOR storage array, the held data is selected according to the column address of the Y-DEC 150, and the selected data is transmitted to the input/output component 340.

The NAND flash memory 200 includes components as follows. A NAND storage cell array 210 connects multiple storage cells in series arranged in a matrix to form NAND strings. A X-DEC 220 selects/drives blocks and word lines according to row addresses. A page buffer/readout circuit 230 holds data read from a selected page of the NAND storage cell array 210, or holds data to be programmed to the selected page. A cache register 240 transmits data between the page buffer/readout circuit 230 (for example, in ½ page units). Also, a Y-DEC 250 selects bit lines according to column addresses. Additionally, although not shown in the figure, the stacked flash memory 20 may include, for example, a voltage generation circuit that generates voltages required for data reading, programming, and erasing, as well as an internal clock generation circuit.

The controller 300 includes a NOR controller component 310 that controls the operation of the NOR flash memory 100, a NAND controller component 320 that controls the operation of the NAND flash memory 200, a structural register 330 that stores information related to the operation specifications of the external bus 30, and an input/output component 340 that provides an interface between the external bus 30 and the internal bus 400. The input/output component 340 is connected to the host device 40 via the external bus 30, receiving, for example, instructions, addresses, and data from the host device 40. Additionally, the input/output component 340 is connected to the NOR flash memory 100 and the NAND flash memory 200 via the internal bus 400.

In SPI, data is serially output or serially input in synchronization with the rising edge and/or falling edge of the serial clock signal. During programming operation, data serially input from the external bus 30 is programmed to the NOR flash memory 100 and/or NAND flash memory 200 via the input/output component 340 and the internal bus 400. During read operation, data read from the NOR flash memory 100 and/or the NAND flash memory 200 is serially output from the external bus 30 to the host device 40 via the internal bus 400 and the input/output component 340.

The controller 300 controls the operation of the NOR flash memory 100 or the NAND flash memory 200 according to instructions received from the host device 40 via the external bus 30, and further controls data transmission on the internal bus 400. The NOR controller component 310 mainly controls the operation of the NOR flash memory 100, while the NAND controller component 320 mainly controls the operation of the NAND flash memory 200. The NOR controller component 310 controls the reading, programming, erasing, and other operations of the NOR flash memory 100 according to instructions received from the input/output component 340, or the NAND controller component 320 controls the NAND flash memory 200 according to specific instructions received from the input/output component 340.

In the situation where a specific instruction controls the programming of the NAND flash memory 200, the NOR controller component 310 generates internal instructions and internal addresses for controlling the programming of the NAND flash memory 200, and causes the NAND controller component 320 to control the NAND flash memory 200 according to the generated internal instructions and internal addresses. The NOR controller 310, for example, refers to a look-up-table (LUT) to generate internal addresses corresponding to the addresses received from the host device 40. The NAND flash memory 200, in response to the received internal instructions, programs the data received from the input/output component 340 to the selected page of the NAND storage cell array 210.

Additionally, in the situation where a specific instruction controls the reading of the NAND flash memory 200, the NOR controller 310 generates internal instructions and internal addresses for controlling the reading of the NAND flash memory 200, and causes the NAND controller component 320 to control the NAND flash memory 200 according to the generated internal instructions and internal addresses. The NAND flash memory 200, in response to the received internal instructions, transmit the data read from the selected page of the NAND storage cell array 210 to the page buffer/readout circuit 230.

When the stacked flash memory 20 receives instructions based on NOR flash memory from the host device 40, the NOR controller 310 controls the NOR flash memory 100 and/or NAND flash memory 200 according to the instructions. For example, when the host device 40 programs specific data such as boot code or firmware into the stacked flash memory 20, or reads such specific data, it outputs, for example, specific instructions, addresses to the stacked flash memory 20. Thus, if the host device 40 accesses the stacked flash memory 20 as it would a NOR flash memory, it may read data stored in the expanded NAND flash memory from the stacked flash memory 20.

The structural register 330 stores the IO bus width and the operating frequency of the serial clock signal as information related to the operation specifications of the external bus 30 of the stacked flash memory 20. The operation information is, for example, read from a fuse memory during the power up sequence of the stacked flash memory 20, and loaded into the structural register 330. The host device 40 reads the operation specifications of the external bus 30 stored in the structural register 330, and determines the allocation of specific data for programming the NOR flash memory 100 and the NAND flash memory 200 according to the operation specifications.

Next, the detailed situation of the stacked flash memory of this embodiment will be explained. In the situation where specific data with a defined read size, such as boot data for starting up a system or code used in the system, is read, the data size for a single read operation is divided, and when reading data above a certain size, the data is stored in the NAND flash memory 200.

Since the access during reading is the same as for the NOR flash memory 100, for data stored in the NAND flash memory 200, a relationship is established between the storage address of the NOR flash memory and the storage address of the NAND flash memory. There is no particular limitation on the method to establish the relationship. For example, a look-up-table may be used, or writing (flags) to each address may also be used.

During continuous reading of the NAND flash memory 200, as shown in FIG. 1(B), an initial latency is generated corresponding to the time required to transmit data from the first page of the storage cell array to the page buffer/readout circuit. Therefore, during the time corresponding to the initial latency, data is read from the NOR flash memory, and from the time point when the initial latency ends and reading becomes possible, data is read from the NAND flash memory.

The initial latency period during continuous reading of the NAND flash memory is fixed, and the data size that may be read from the NOR flash memory during the latency period, that is, the data size that may be serially output from the stacked flash memory, varies according to the operating frequency of the serial clock signal and the IO bus width of the SPI. The higher or greater the operating frequency or the IO bus width, the larger the data size that may be read from the NOR flash memory (the data size that may be serially output) during the latency period; conversely, the lower or smaller the operating frequency or the bus width, the smaller the data size that may be read from the NOR flash memory during the latency period.

Therefore, when programming specific data, the host device 40 determines the allocation of specific data respectively for programming the NOR flash memory 100 and the NAND flash memory 200 according to the operating frequency of the serial clock signal and the bus width of the IO.

Figure 4:
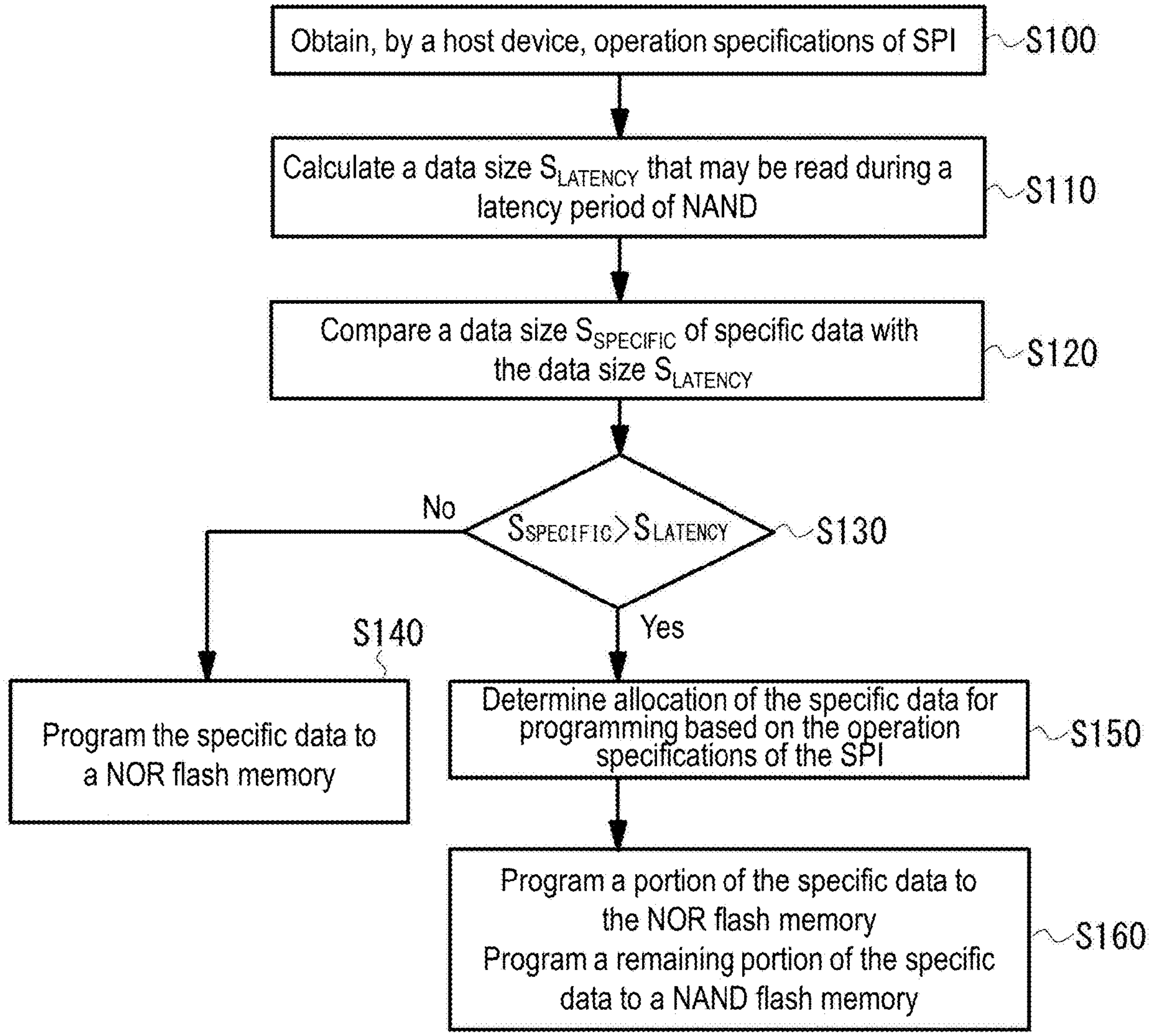
FIG. 4 is a flow diagram of programming operation of specific data in a storage system according to an embodiment of the disclosure.

FIG. 4 is an operation flow when programming specific data to the stacked flash memory in the storage system of this embodiment. The host device 40 accesses the stacked flash memory 20 to obtain the operation specifications of the SPI stored in the structural register 330 (S100). The operation specifications include at least the IO bus width of the SPI and the maximum operating frequency of the serial clock signal. For example, when the stacked flash memory 20 is powered on, the operation specifications are read from the fuse memory and stored in the structural register 330.

Next, the host device 40 calculates a data size $S_{LATENCY}$ that may be serially output during the initial latency period of continuous reading of the NAND flash memory 200 according to the obtained operation specifications (S110). Here, the initial latency period is known.

Table 1 shows an example of the data size that may be read from the NOR flash memory 100 during the period before the NAND flash memory 200 becomes Ready, assuming the initial latency of the NAND flash memory is 60 μS, through the relationship between IO bus width and operating frequency. For example, at an operating frequency of 52 MHz and a bus width of ×1, the data size that may be read during the latency period is 3121 bits (391 bytes); if the bus width is ×4, then the readable data size is 4 times that at 12484 bits (1561 bytes). Additionally, if the operating frequency is 104 MHz, then with a bus width of ×1, 6244 bits (781 bytes) may be read, and with a bus width of ×4, 24976 bits (3122 bytes) may be read.

TABLE 1

| Frequency and IO during initial boot | | ns/clk | # clk/ 60 us | Numbers of IO | Data bits | Data bytes (1) |
|---|---|---|---|---|---|---|
| 52 MHz | ×1 | 19.23 | 3121 | 1 | 3121 | 391 |
| | ×4 | 19.23 | 3121 | 4 | 12484 | 1561 |
| 104 MHz | ×1 | 9.61 | 6244 | 1 | 6244 | 781 |
| | ×4 | 9.61 | 6244 | 4 | 24976 | 3122 |
| 166 MHz | ×1 | 7.51 | 7990 | 1 | 7990 | 999 |
| | ×4 | 7.51 | 7990 | 4 | 31960 | 3995 |

Next, the host device 40 compares the data size $S_{SPECIFIC}$ of the specific data to be programmed to the stacked flash memory 20 with the data size $S_{LATENCY}$ that may be read during the latency period (S120). The specific data, for example, is boot data or code data used for starting the system, and the size thereof is known.

In the situation where the size $S_{SPECIFIC}$ of the specific data is smaller than the data size $S_{LATENCY}$ that may be read during the latency period (S130), the host device 40 programs all the specific data to the NOR flash memory 100 (S140). In this situation, the specific data is read without being affected by the latency of the NAND flash memory.

On the other hand, in the situation where the size $S_{SPECIFIC}$ of the specific data is larger than the data size $S_{LATENCY}$ that may be read during the latency period (S130), the host device 40 determines the allocation of the specific data for programming based on the operation specifications of the SPI (S150). Specifically, a maximum data size SMAX allocated to the NOR flash memory 100 is SMAX=frequency×latency time×bit width (numbers of IO). For example, if the clock frequency is 52 MHz, the latency is 60 μS, and the numbers of IO is 1 bit, then SMAX=(60×1000)/19.23=3121 bits. The specific data programmed to the NOR flash memory 100 is of the maximum data size SMAX or below.

The host device 40, according to the determined allocation of specific data, programs a portion of the specific data equivalent to the latency data size $S_{LATENCY}$ to the NOR flash memory 100, and programs a remaining portion of the specific data to the NAND flash memory 200 (S160).

In the situation where the size of the specific data is 2048 bytes, if using the example shown in Table 1, then in the situations where the clock frequency is 104 MHz with IO×4 and 166 MHz with IO×4, since the 2048 bytes of specific data is smaller than the data size that may be read during the latency period (the hatched portion), the data readout from the NOR flash memory ends before the latency of the NAND flash memory. Therefore, all specific data is programmed to the NOR flash memory 100.

In other operation specifications, since the 2048 bytes of specific data is larger than the data size that may be read during the latency period, the data readout continues even after the initial latency of the NAND flash memory ends. Therefore, the specific data is allocated and programmed to both the NOR flash memory 100 and the NAND flash memory 200. For example, in the case of 52 MHz with IO×4 in the table, the host device 40 programs up to 1561 bytes to the NOR flash memory and programs from 1562 bytes to 2048 bytes to the NAND flash memory.

When writing specific data, data registration is processed in synchronization with the clock. Since the number of clock cycles becomes the data size written, the host device 40 counts the number of serial clock cycles and writes the specific data to the respective NOR flash memory and NAND flash memory according to the determined data allocation. Furthermore, in the case of double data rate (DDR) where data registration is synchronized with both the rising and falling edges of the clock, data registration is processed twice per cycle.

More specifically, when the NOR controller component 310 receives a programming command, address, and specific data from the host device 40, a portion of the specific data is programmed to the NOR storage cell array 110 based on the received address. Subsequently, the NAND controller component 320 programs a remaining portion of the specific data to the NAND storage cell array 210. At this time, the NOR controller component 310 establishes a relationship between the address of the specific data programmed to the NOR storage cell array 110 and the address of the specific data programmed to the NAND storage cell array 210. There is no particular limitation on the method to establish the relationship, which may be performed using a look-up-table that defines the relationship between the address space of the NOR storage cell array 110 and the address space of the NAND storage cell array 210, or by setting flags and/or NAND storage array address destinations associated with the specific data programmed to the NOR storage cell array 110, or by setting flags and/or NOR storage cell array 110 address sources associated with the specific data programmed to the NAND storage cell array 210, thereby defining the relationship between the specific data programmed to the NOR storage cell array 110 and the specific data programmed to the NAND storage array. In this way, according to the data allocation set based on the SPI-based operation specifications, the specific data is written to both the NOR storage cell array 110 and the NAND storage cell array 210.

In the write operation, after writing specific data with a data size $S_{LATENCY}$ corresponding to the latency to the NOR flash memory, the remaining specific data is written to the NAND flash memory, but the operation is not limited to this writing manner. For example, the host device 40 may write a portion of the specific data to the NOR flash memory 100, and in parallel write a remaining portion of the specific data to the NAND flash memory 200, or the host device 40 may also write all of the specific data to each of the NOR flash memory 100 and the NAND flash memory 200. The latter situation may keep a backup of the specific data in the NAND flash memory 200, such as data requiring reliability like boot data.

Figure 5:
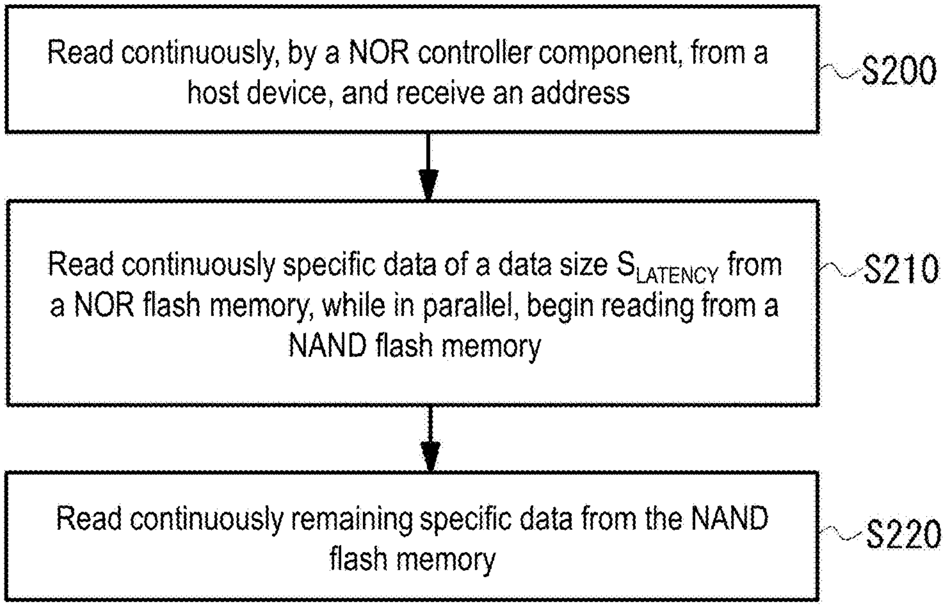
FIG. 5 is a flow diagram of read operation of specific data in a storage system according to an embodiment of the disclosure.

FIG. 5 is an operation flow when continuously reading out specific data from the stacked flash memory in the storage system of this embodiment. The NOR controller component 310 receives a continuous read command and address from the host device 40 as shown in FIG. 1(A) (S200). The continuous read command here is distinguished from the normal data continuous read command, and the NOR controller component 310 identifies it as a continuous read of specific data.

The NOR controller component 310, based on the received address, begins continuous reading of specific data from the NOR flash memory 100 (S210). The read data is output to the host device 40 from the external bus 30 in synchronization with the serial clock signal.

The NOR controller component 310 and the NOR flash memory performs continuous reading, while in parallel, the NAND flash memory begins continuous reading of specific data via the NAND controller component 320 (S210). The NAND controller component 320 identifies the address of the NAND storage cell array 210 according to the relationship method of the address (such as the look-up-table or flags), and begins reading the specific data from the NAND storage cell array 210 through the identified address.

In the continuous reading of the NAND flash memory, an initial latency occurs during the period until data is read from the selected page of the storage array to the page buffer/readout circuit. During this initial latency period, the specific data stored in the NOR flash memory 100 is continuously read out.

When the specific data read from the NOR flash memory 100 ends, the remaining specific data is continuously read from the NAND flash memory 200 (S220). That is, the specific data maintained in a pipeline manner in the page buffer/readout circuit 230 and the cache register 240 is serially output to the host device 40 from the external bus 30 in synchronization with the serial clock signal.

Figure 6A:
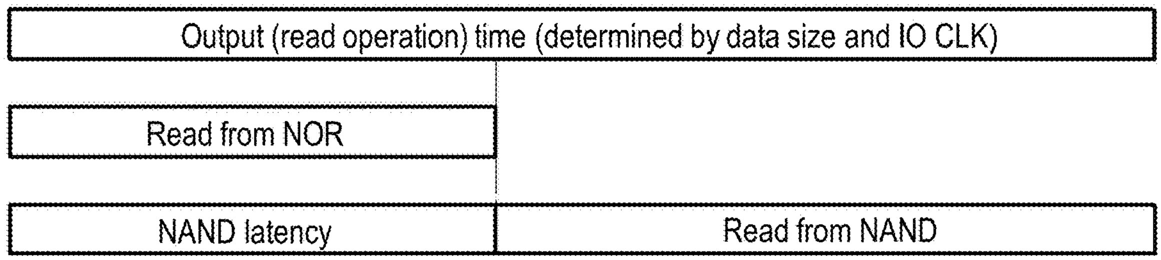
FIG. 6(A) to FIG. 6(C) are diagrams illustrating examples of reading specific data of various data sizes in an embodiment of the disclosure.
Figure 6B:
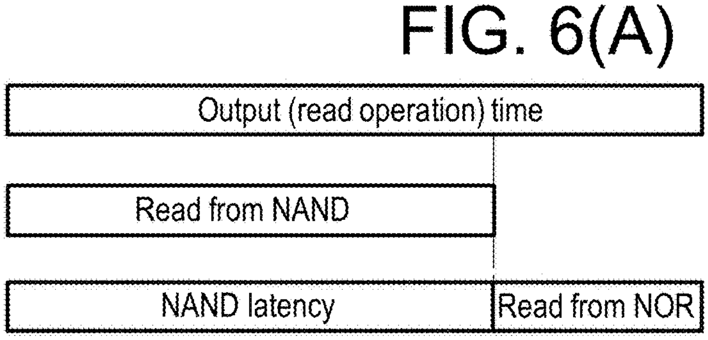
Figure 6C:
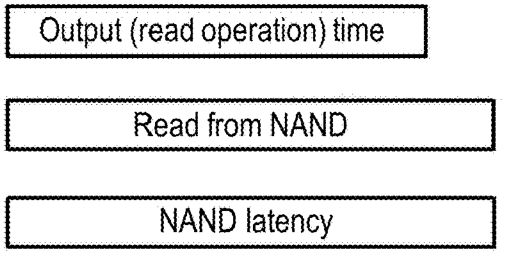

FIG. 6(A) to FIG. 6(C) are diagrams illustrating examples of reading specific data of various data sizes. FIG. 6(A) and FIG. 6(B) are examples where the specific data is larger than the data size $S_{LATENCY}$ corresponding to the latency. During the read latency period of the NAND flash memory, the specific data of the data size $S_{LATENCY}$ is continuously read from the NOR flash memory 100, followed by continuous reading of the remaining specific data from the NAND flash memory 200. FIG. 6(C) is an example where the specific data is smaller than the data size $S_{LATENCY}$ corresponding to the latency. The specific data is only continuously read from the NOR flash memory 100 without storing the specific data.

Thus, according to this embodiment, when the specific data is stored in the stacked flash memory including the NOR flash memory and the NAND flash memory, and when reading the specific data from the stacked flash memory, the array read latency generated by the NAND flash memory may be effectively offset, achieving high-speed reading that resolves the weakness of initial latency in NAND flash memory.

Additionally, according to this embodiment, the system may omit instruction and address input at startup, as well as the detection of the initial read busy time (tR) of the NAND flash memory. Furthermore, the specified address may be anywhere in the user area, thereby expanding the freedom of address mapping.

In this embodiment, an operation example using both the NOR flash memory 100 and the NAND flash memory 200 is shown, but it is also possible to use the NOR flash memory 100 and the NAND flash memory 200 separately as individual units.

The preferred embodiments of the disclosure have been described in detail, but the disclosure is not limited to specific embodiments and may undergo various modifications and changes within the scope of the subject matter of the disclosure as described in the appended claims.

What is claimed is:

1. A semiconductor device, comprising a NOR flash memory and a NAND flash memory, wherein the semiconductor device comprises:

an input/output component capable of inputting/outputting data via an input/output bus in synchronization with a serial clock signal; and a controller component controlling operations of the NOR flash memory and the NAND flash memory, wherein in response to a read instruction received from the input/output component, the controller component causes a portion of specific data read from the NOR flash memory to be serially output from the input/output component, and then causes a remaining portion of the specific data read from the NAND flash memory to be serially output from the input/output component.

2. The semiconductor device according to claim 1, further comprising a register storing information related to operation specifications of the input/output component, wherein the register is accessible from external.

3. A storage system, comprising the semiconductor device according to claim 2, and a host device connected to the semiconductor device via the input/output bus, wherein in the storage system, the host device acquires the information related to the operation specifications stored in the register, and based on the information related to the operation specifications, allocation of specific data for programming the NOR flash memory and the NAND flash memory is determined.

4. The storage system according to claim 3, wherein the controller component outputs the portion of the specific data during an initial latency period of continuous reading of the NAND flash memory.

5. The storage system according to claim 3, wherein in response to a write instruction received from the input/output component, the controller component writes the portion of the specific data to the NOR flash memory and writes the remaining portion of the specific data to the NAND flash memory.

6. The storage system according to claim 3, wherein the portion of the specific data corresponds to a size corresponding to a bus width of the input/output component and a frequency of the serial clock signal.

7. The semiconductor device according to claim 1, wherein the controller component outputs the portion of the specific data during an initial latency period of continuous reading of the NAND flash memory.

8. The semiconductor device according to claim 1, wherein in response to a write instruction received from the input/output component, the controller component writes the portion of the specific data to the NOR flash memory and writes the remaining portion of the specific data to the NAND flash memory.

9. The semiconductor device according to claim 1, wherein the portion of the specific data corresponds to a size corresponding to a bus width of the input/output component and a frequency of the serial clock signal.

10. The semiconductor device according to claim 9, wherein the portion of the specific data is less than or equal to a data size that can be serially output during an initial latency period of continuous reading of the NAND flash memory.

11. An operation method, comprising a method of operating a semiconductor device comprising a NOR flash memory and a NAND flash memory, wherein in response to a read instruction received from an input/output component, a controller component controlling operations of the NOR flash memory and the NAND flash memory causes a portion of specific data read from the NOR flash memory to be serially output, and then causes a remaining portion of the specific data read from the NAND flash memory to be serially output.

12. The operation method according to claim 11, wherein the controller component outputs the portion of the specific data during an initial latency period of continuous reading of the NAND flash memory.

13. The operation method according to claim 11, wherein in response to a write instruction received from the input/output component, the controller component writes the portion of the specific data to the NOR flash memory and writes the remaining portion of the specific data to the NAND flash memory.

14. The operation method according to claim 11, wherein the portion of the specific data corresponds to a size corresponding to a bus width of the input/output component and a frequency of the serial clock signal.

15. The operation method according to claim 14, wherein the portion of the specific data is less than or equal to a data size that can be serially output during an initial latency period of continuous reading of the NAND flash memory.

* * * * *